United States Patent
Haribhatt

(10) Patent No.: US 10,290,194 B2
(45) Date of Patent: May 14, 2019

(54) OCCUPANCY SENSOR

(71) Applicant: Analog Devices Global, Hamilton (BM)

(72) Inventor: Akshayakumar Haribhatt, Gulbarga (IN)

(73) Assignee: Analog Devices Global, Hamilton (BM)

( * ) Notice: Subject to any disclaimer, the term of this patent is extended or adjusted under 35 U.S.C. 154(b) by 0 days.

(21) Appl. No.: 15/056,560

(22) Filed: Feb. 29, 2016

(65) Prior Publication Data

US 2017/0249820 A1    Aug. 31, 2017

(51) Int. Cl.
| | |
|---|---|
| *G06K 9/00* | (2006.01) |
| *G08G 1/14* | (2006.01) |
| *G08B 21/02* | (2006.01) |
| *G08G 1/005* | (2006.01) |

(52) U.S. Cl.
CPC .......... *G08B 21/02* (2013.01); *G06K 9/00771* (2013.01); *G08G 1/005* (2013.01); *G08G 1/14* (2013.01)

(58) Field of Classification Search
CPC ............ G06K 9/6256; G06K 9/00771; G06K 9/00362; G06T 2207/10016; G06T 2207/30232; G06T 7/20; H04N 7/183; H04N 7/18; G08B 13/19606; G08B 25/001

See application file for complete search history.

(56) References Cited

U.S. PATENT DOCUMENTS

| | | | |
|---|---|---|---|
| 6,050,369 A | 4/2000 | Leone et al. | |
| 6,107,930 A | 8/2000 | Behlke | |
| 6,163,257 A | 12/2000 | Tracy | |
| 6,486,778 B2 | 11/2002 | Mahler et al. | |
| 7,868,912 B2 | 1/2011 | Venetianer et al. | |
| 8,184,154 B2 | 5/2012 | Estevez et al. | |
| 2004/0252034 A1 | 12/2004 | Slemmer | |
| 2012/0087573 A1 | 4/2012 | Sharma et al. | |
| 2013/0201290 A1* | 8/2013 | Holland | H04N 7/181 348/46 |
| 2015/0022316 A1* | 1/2015 | Dixon | G08B 25/001 340/5.51 |
| 2015/0117705 A1 | 4/2015 | Zhang | |

(Continued)

FOREIGN PATENT DOCUMENTS

WO     WO-2017149386     9/2017

OTHER PUBLICATIONS

"International Application Serial No. PCT/IB2017/000250, International Search Report dated Jun. 14, 2017", 4 pgs.

(Continued)

*Primary Examiner* — Mirza F Alam
(74) *Attorney, Agent, or Firm* — Schwegman Lundberg & Woessner, P.A.

(57) ABSTRACT

System and techniques for an occupancy sensor are described herein. Images from a camera can be received. Here, the camera has a certain a field of view. A proximity indicator from a proximity detector can be received when an object enters the field of view. The images from the camera are processed to provide an occupancy indication. A first technique is used for the occupancy indication in the absence of the proximity indicator and a second technique is used otherwise.

25 Claims, 4 Drawing Sheets

(56) References Cited

U.S. PATENT DOCUMENTS

| | | | |
|---|---|---|---|
| 2015/0235551 A1* | 8/2015 | Maneskiold | G08B 25/001 |
| | | | 348/155 |
| 2015/0363009 A1* | 12/2015 | Clarkson | G06F 3/017 |
| | | | 348/169 |
| 2016/0180175 A1* | 6/2016 | Bitton | G06K 9/00771 |
| | | | 348/143 |
| 2016/0300468 A1* | 10/2016 | Stricker | G08B 21/02 |
| 2016/0323970 A1* | 11/2016 | Weber | H05B 37/0227 |

OTHER PUBLICATIONS

"International Application Serial No. PCT/IB2017/000250, Written Opinion dated Jun. 14, 2017", 5 pgs.

"International Application Serial No. PCT/IB2017/000250, International Preliminary Report on Patentability dated Sep. 13, 2018", 7 pgs.

\* cited by examiner

OCCUPANCY SENSOR

TECHNICAL FIELD

Embodiments described herein generally relate to facility automation and more specifically to an occupancy sensor.

BACKGROUND

Occupancy detection is an important aspect of several systems, such as facilities automation (e.g., illuminating an area when people are present), security, city management, etc. For example, outdoor occupancy sensing may enable intelligent street lights for smart cities, traffic monitoring in roadways, among other applications. Some occupancy sensors may employ video, infrared (IR), depth, or other sensors to make occupancy decisions.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
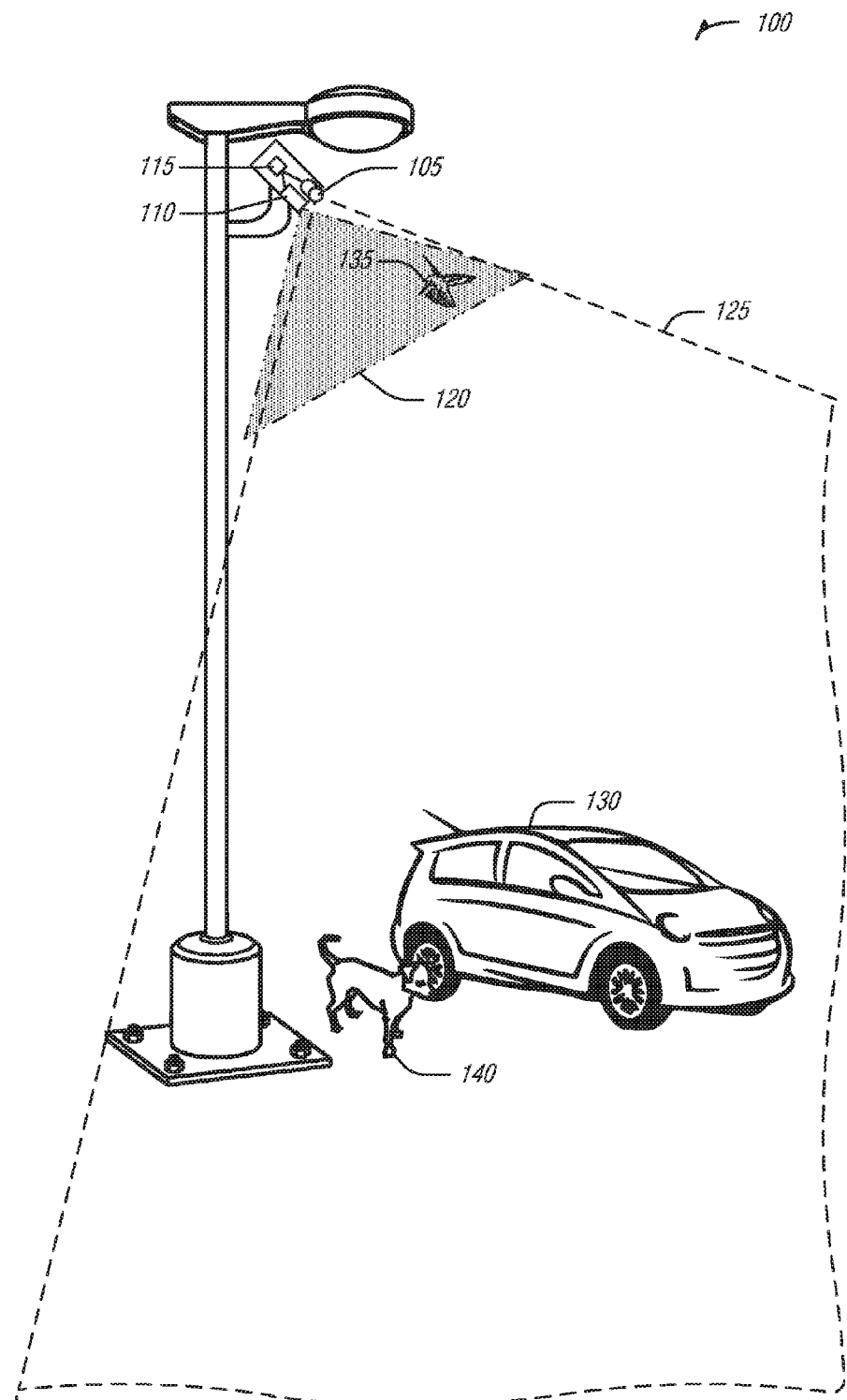
FIG. 1 is a block diagram of an example of an environment including an occupancy sensor, according to an embodiment.

Current occupancy sensors employ several techniques. For example, a sensor may employ a video based technique looking for differences between frames to establish motion in a field of view. Some techniques are combined, such as turning the video camera on to process motion after a laser, sonar, radar, or other sensor triggers a reading.

A variety of techniques can be used for video based motion detection. One such technique employs a difference comparison between previous frames and a current frame. One such difference comparison is the Mixture of Gaussians (MOG) technique. Generally, these techniques identify foreground (e.g., moving) objects from background (e.g., stationary objects) by subtracting a current frame from one or more previous frames. The pixels remaining, for example, are the foreground objects. These pixels can be grouped into blobs, a blob being a foreground object. If one desired to detect occupancy for humans, one could test the volume of a blob with an expected volume of a human to discern between a human and a dog, for example.

Other techniques may employ a variety of artificial intelligence (AI) technologies, such as neural network classifiers or the like. Generally, the AI techniques provide greater abilities to distinguish between the objects (e.g., whether a moving object is a human or a dog) that are observed but are computationally expensive, resulting in greater power consumption. In contrast, difference techniques, like MOG, are fast and power efficient. Thus, in many implementations, a form a difference technique is employed.

Although difference techniques are efficient, there are situations that are poorly handled by these techniques. For example, when installed outdoors, the camera perspective may result in a trash (e.g., a blowing bag), or a small animal, such as a bird or insect, forming a foreground blob (because it is moving) that has a volume exceeding the triggering threshold. In these cases, a simple application of the difference technique may result in false positive detections. In an example, where the occupancy sensor is employed to turn on a streetlight, the light will turn on needlessly, wasting power. What is needed is an occupancy sensor that can detect such intrusions into the camera's field of view that are likely to cause these false positives and distinguish between desired foreground objects and undesired foreground objects to prevent false positive results.

The occupancy sensor described herein adds a proximity detector to the camera. The proximity detector is arranged such that it alerts when an object is within a predetermined distance within the camera's field of view. When the proximity detector is not alerting (e.g., when nothing is within the predetermined distance), the occupancy sensor processes its video using an efficient, difference based technique, such as MOG. However, when the proximity detector does alert, the occupancy sensor changes its sensing technique to include a classifier to differentiate between foreground objects, triggering an occupancy indication when the classifier indicates a target foreground object is observed. In this way, the occupancy sensor can operate in an efficient manner while reducing false positive results. Additional details, examples, and embodiments are described below.

FIG. 1 is a block diagram of an example of an environment including an occupancy sensor 100, according to an embodiment. The occupancy sensor 100 includes a camera 105, a proximity detector 110, and a controller 115. These components are implemented in hardware, including circuitry as described below with respect to FIG. 4. The camera 105 and proximity detector 110 are positioned such that a sensing area 120 for the proximity detector 110 overlaps with a field of view 125 for the camera 105. The controller 115 is arranged to be communicatively coupled to the camera 105 and the proximity detector 110 when the occupancy sensor 100 is in operation, but may be directly connected (e.g., via a bus, interlink, general input-output pins, socket, etc.), connected via a network (e.g., wired or wireless), or contained in a single enclosure or mounting.

Figure 2:
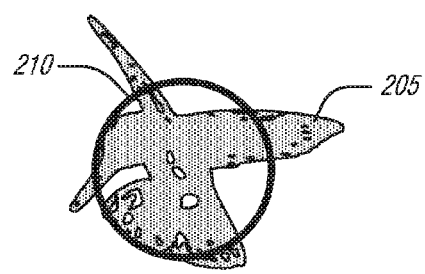
FIG. 2 illustrates an image from a camera perspective, according to an embodiment.
Figure 2:
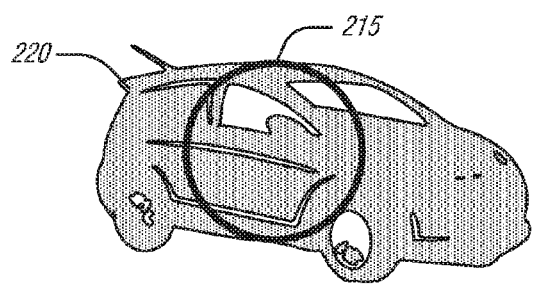
Figure 2:
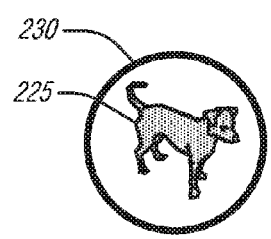

FIG. 1 illustrates a problematic outdoor environment. All of a bird 135, a dog 140, and a car 130 are in the camera's field of view 125 and all are moving. As noted above, the proximity of the bird 135 to the camera 105 can result in a large blob. In other systems, such a large blob may trigger a false positive occupancy indication when a large object, such as the car 130, is desired. In contrast, the dog 140 would likely be ignored due to its small size in relation to the car 130 and their similar position within the field of view 125. FIG. 2. illustrates an example of this principle. However, as illustrated in FIG. 1, the bird 135 is within the proximity detector's sensing area 120, triggering an enhanced technique to discern between the car 130 and the bird 135.

The proximity detector 110 may be of any type that provides a proximity indicator when an object is within a threshold distance. For example, the proximity detector may be a sound-based (e.g., hypersonic) detector or an active IR sensor that emits energy into the environment and measures the reflection of that energy. In an example, the proximity detector 110 has a fixed threshold distance. In this example, the proximity detector 110 provides the proximity indicator when an object of sufficient size (e.g., large enough for the sensor to detect) moves into the sensing area 120. In an example, the fixed threshold distance may be adjusted at set-up, or later, by an external entity, such as a maintenance person, etc.

In an example, the proximity indicator is considered negative when there is no communication with the proximity detector 110 and positive otherwise. In an example, the proximity indicator is a communication indicating positive (something triggers the proximity detector 110) or negative (nothing has triggered the proximity detector 110). In an example, the proximity indicator is binary (e.g., ON or OFF). In an example, the proximity indicator is a distance. The proximity indicator is not, however, a depth sensor that provides a depth image of objects.

The camera 105 produces images from light. In an example, the camera 105 is a two-dimensional camera, producing two-dimensional images. In an example, the camera 105 is a multi-wavelength (e.g., multi-color) camera.

The controller 115 contains processing circuitry (e.g., a digital signal processor or the like) and communication interfaces to the camera 105 and the proximity detector 110. Thus, the controller 115 is arranged to receive images from the camera 105. The controller 115 is also arranged to receive the proximity indicator from the proximity detector 110.

The controller 115 is also arranged to process the images from the camera 105 to provide an occupancy indication. An occupancy indication is an output signal (e.g., on a wire, in a message, etc.) indicating that an observed area is occupied by a target moving object. To provide the occupancy signal from the camera 105, the controller 115 processes the images using a first technique in the absence of the proximity indicator. Here, absence also includes receiving a negative proximity indicator. In either case, the proximity detector 110 has not detected an object within the fixed threshold distance. The controller 115 will use a second technique to process the images for the occupancy indication when the proximity indicator indicates that an object is within the threshold distance.

In an example, the first technique is a low-power technique. In an example, the first technique includes identifying a foreground object. As noted above, foreground objects are moving objects whereas background objects are not moving. However, a variety of filtering techniques may be applied to eliminate movement by background objects, such as the swaying of trees. These techniques may include tracking cyclical movements and ignoring them. In an example, foreground objects may be identified via a difference technique, whereby a current frame is subtracted by a previous frame. The remaining pixels relate to movement between the frames. Incorporating a longer term view of the previous frame, a number of previous frames may be used to determine the reference of the background. A mixture of Gaussians (MOG) technique may be employed to create the reference frame and determine the pixels associated with movement in the current frame.

Once the group of pixels (e.g., a blob) is identified for foreground objects, the occupancy indication is triggered when the blob is beyond a threshold size. Such a calculation is relatively efficient and allows for the low power operation of the first technique without, for example, triggering the occupancy indication on undesirable targets. For example, if the target object is the car 130, to for example, turn on a light, one may wish to distinguish over the dog 140. As each are moving, using the blob size provides a straight forward way to distinguish between the car 130 and the dog 140. An example is discussed below with respect to FIG. 2.

The second technique provides greater detail with regard to the type of foreground object observed. In an example, the second technique includes application of a classifier to distinguish between targets. As used herein, a classifier is an implementation of a family of AI techniques to process images and classify, or label object found therein. Classifiers may also be called statistical learning methods, and generally apply some form of pattern matching to output a result given the image. For example, a classifier may be trained to recognize a cat in an image. Such a classifier, when given an image, will determine, for example, whether a cat is present, a type of cat, or a location of the cat in the image. Classifiers may be implemented in a number of ways, such as via neural networks, kernel methods such as the support vector machines, the k-nearest neighbor algorithm, the Gaussian mixture model, naive Bayes classifiers, and decision trees, among others.

In an example, the classifier is applied to the images. In an example, the classifier is applied to portions of the image that correspond to the foreground object blobs identified via the first technique. In an example, the classifier is applied to the blobs themselves, identified by first applying the first technique. In an example, the classifier is applied only to those blobs that are beyond the threshold size. Thus, for example, the classifier is not applied to the dog 140 blob but is applied to the bird 135 and the car 130 blobs.

The controller 115 will provide the occupancy indication based on the result of the classifier. In an example, the classifier is trained to identify an inclusion object. In this example, the occupancy indication is provided when the classifier does identify the foreground object. Such an approach may have the advantage of a more simple classifier when, for example, the inclusion object is of limited shape, such as a limited set of vehicles. In an example, the classifier is trained to identify an exclusion object. In this example, the occupancy indication is provided when the classifier does not identify the foreground object. In an example, the exclusion object is a flying animal (e.g., bird, insect, etc.) or debris (e.g., tree branches, dust, snow, paper, etc.).

The occupancy sensor 100 provides an elegant solution to the problems occupancy sensors have had, including remaining power efficient while reducing false-positive occupancy indications. The addition of the proximity detector 110 is a low-cost and easy to integrate modification for video-based occupancy sensors that avoids the complexity of such things as depth-cameras, millimeter wave radar and the like. Moreover, using AI visual classification sparingly, when an object triggers the proximity detector 110, allows the controller 115 to use power efficient visual occupancy techniques when there is no such triggering object.

FIG. 2 illustrates an image 200 from a camera perspective, according to an embodiment. The image 200 includes a bird blob 205, a car blob 220 and a dog blob 225, which respectively correspond to the bird 135, car 130, and dog 140 illustrated in FIG. 1. As noted above, the blobs are collections of pixels that are deemed foreground objects via their change between a current image and one or more previous images.

As a simple illustrative technique, a thresholding size is applied to the blobs as noted above, to distinguish between target foreground objects and those objects that should not trigger occupancy. For example, the car blob 220 is larger than the threshold object 215 and thus is a target foreground object while the dog blob 225 is smaller than the threshold object 230 and thus is not a target foreground object. This assumes that, for example, occupancy for cars is desirable. The inverse may be true, for example, if one wished to ignore cars in favor of smaller objects.

The bird blob 205, however, illustrates the problem addressed by the occupancy sensor 100. The bird blob 205 is larger than the threshold object 210 while, in reality, the bird 130 is quite small. The error is due to the proximity of the bird 130 to the camera 105 and the camera's perspective. Thus, as noted above, the bird 130 would trigger an occupancy indication erroneously. However, as illustrated in FIG. 1, the bird 130 is within the sensing area 135, and would also trigger the proximity detector 110 to provide the proximity indicator (e.g. a positive proximity indicator). Thus, in this situation, the controller 115 would not rely on the simple thresholding of blobs, but would invoke the classifier. The classifier would, if trained to recognize cars, for example, reject the bird blob 205. The remaining car blob 220 would, however, trigger the occupancy indication.

Figure 3:
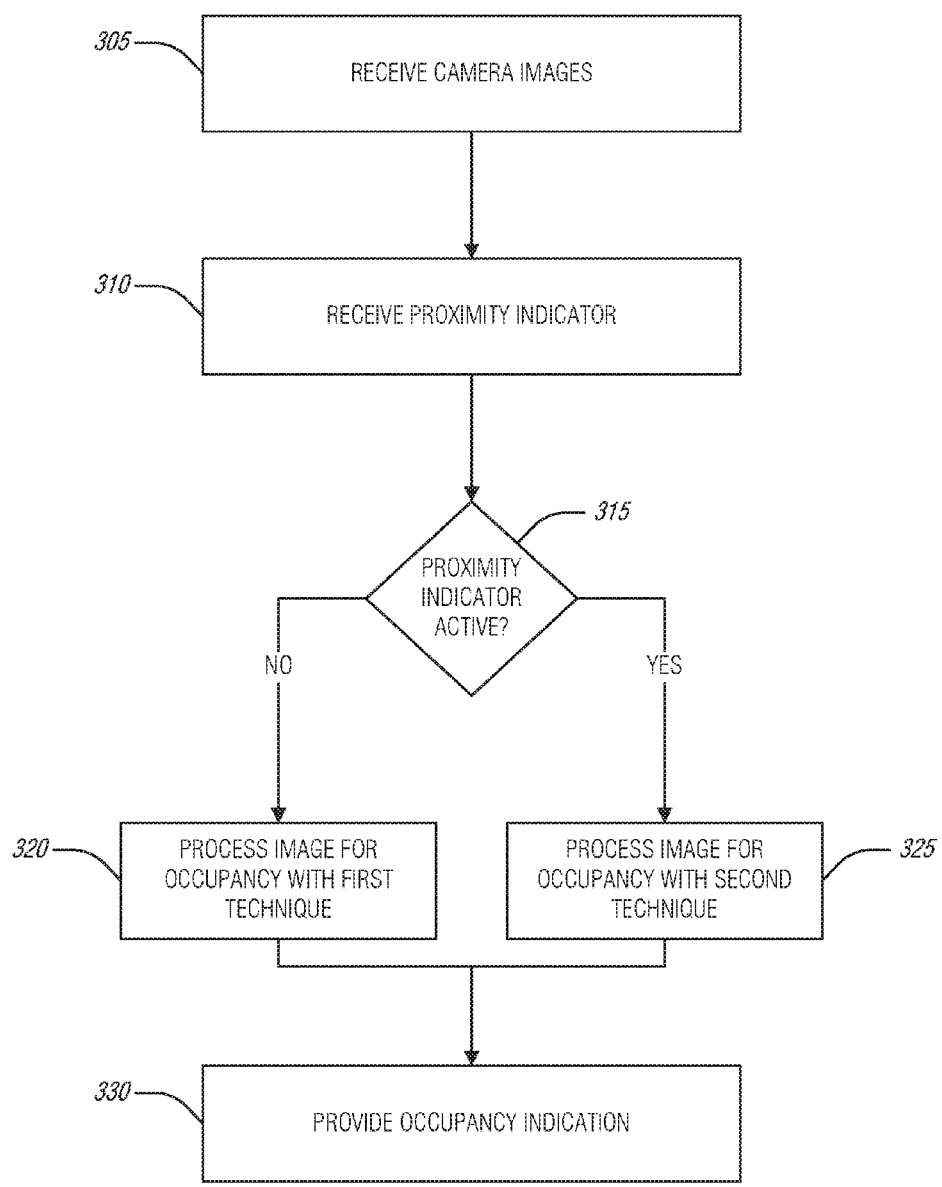
FIG. 3 illustrates a flow diagram of an example of a method for an occupancy sensor, according to an embodiment.

FIG. 3 illustrates a flow diagram of an example of a method 300 for an occupancy sensor, according to an embodiment. The operations of the method 300 are carried on computer hardware, such as that described above with respect to FIG. 1, or below with respect to FIG. 4 (e.g., processors, circuitry, etc.).

At operation 305, images are received from a camera. The images may be pulled (e.g., requested) or pushed (e.g., transmitted by the camera). The images are or a scene to which the camera is directed, the scene defined by the camera's field of view. In an example, the images are two-dimensional images, as contrasted with depth, or three-dimensional images.

At operation 310, a proximity indicator is received from a proximity detector. The proximity detector is arranged such that it detects an object within the camera's field of view out to a threshold distance. In an example, the threshold distance is fixed during operation, but may be adjusted during setup or during maintenance. In an example, the proximity detector is an active IR device. In an example, the proximity sensor is a laser-based device.

At decision 315, a determination as to whether the proximity indicator is active is made. In an example, the proximity indicator is active when it is received, for example, via one or more pins to a general I/O port. In an example, the proximity indicator is active when it includes a message or payload indicating that it is active. In an example, the proximity sensor is active when it includes a distance within an acceptable range (e.g., within one meter, between 100 centimeters and two meters, etc.).

At operation 320, when the proximity indicator is not active, the images are processed for occupancy using a first technique. In an example, the first technique is a power-efficient technique. In an example, applying the first technique includes identifying a foreground object. In an example, the MOG technique is used to identify the foreground object from a sequence of the images.

In an example, applying the first technique includes thresholding of found foreground objects against a size model. If the foreground object is smaller than a lower-bound threshold, then the method 300 will not proceed to operation 330. Conversely, if the object is smaller than an upper-bound threshold, the method 300 will continue to operation 330.

At operation 325, when the proximity indicator is active, the images are processed for occupancy using a second technique. In an example, the second technique includes applying a classifier to a foreground object. In an example, the classifier is applied to the foreground object when the foreground object is beyond the threshold size. As noted above, the classifier may also be applied to the current image, a sequence of images, portions of the current image corresponding to the foreground object, or a pixel blob of the foreground object.

In an example, the classifier is trained to identify an exclusion object. In this example, the method 300 proceeds to operation 330 when the classifier does not identify the foreground object. That is, the foreground object is not to be excluded because the classifier did not recognize it. In an example, an exclusion object includes at least one of a flying animal or debris. In an example, the classifier is trained to identify an inclusion object. In this example, the method proceeds to operation 330 when the classifier does identify the foreground object. In an example, a foreground object includes at least one of a human or a vehicle.

At operation 330, an occupancy indication is provided based on the technique used. Thus, as noted in operations 320 and 325, depending on the results of the technique, the method 300 arrives at this operation to output an occupancy indication. In an example, the occupancy indication includes a count of filtered foreground objects. In an example, the occupancy indication includes a translated position of foreground objects. In this example, the position of the object in the real-world is translated from the object's location in the image and known values for the camera's mounting (e.g., height, direction, pitch, etc.) and optical characteristics. In an example, the occupancy indication includes only a binary indication as to whether there is a foreground object of interest.

Figure 4:
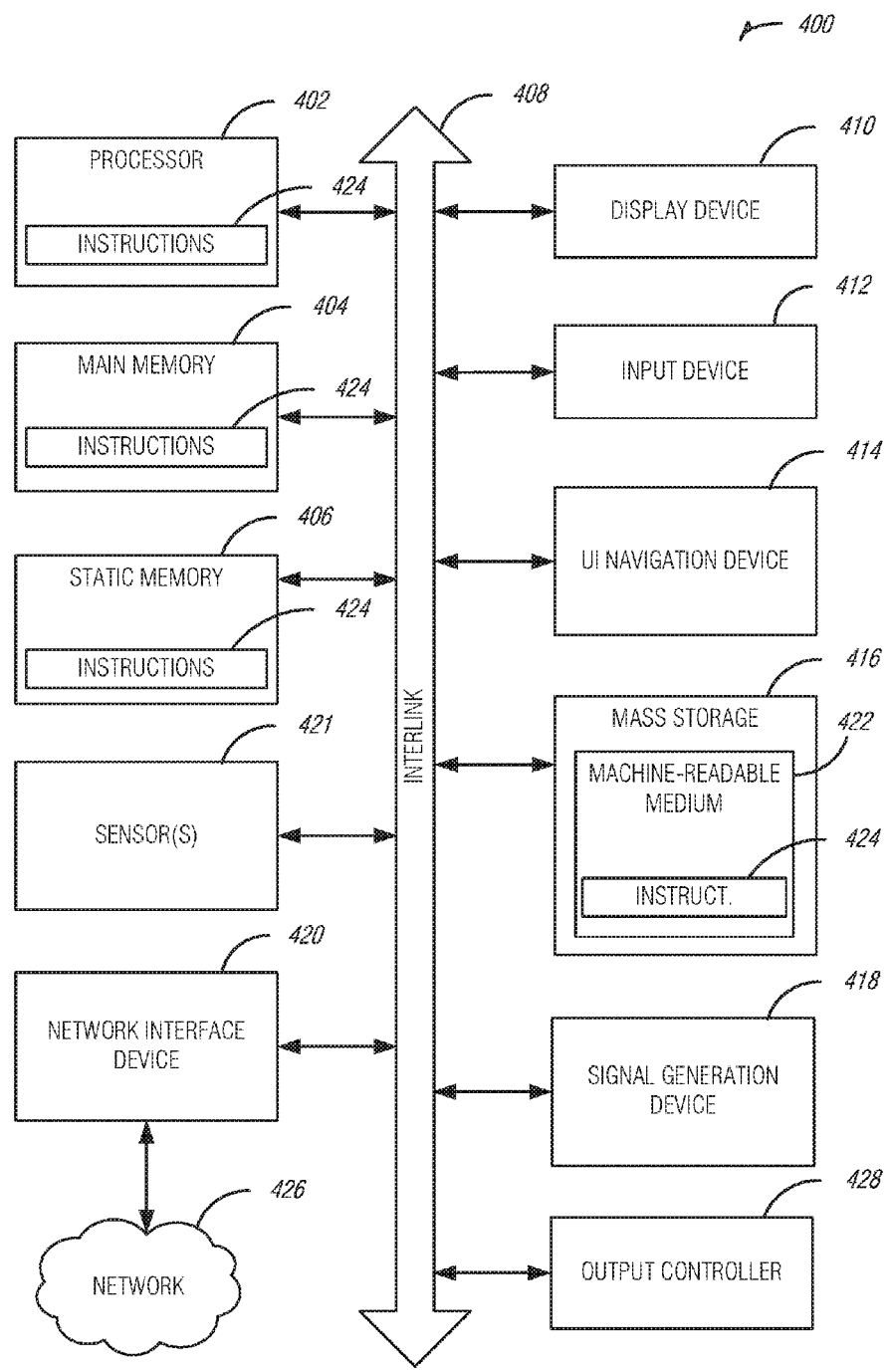
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (UPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

Additional Notes & Examples

Example 1 is a device comprising: a camera with a field of view; a proximity detector arranged to detect an object in the field of view; and a controller to: receive images from the camera; receive a proximity indicator from the proximity detector; and process the images from the camera to provide an occupancy indication, wherein a first technique is used in the absence of the proximity indicator and a second technique is used otherwise.

In Example 2, the subject matter of Example 1 optionally includes wherein the proximity detector has a fixed threshold distance and provides the proximity indicator in response to detecting an object within the fixed threshold distance.

In Example 3, the subject matter of Example 2 optionally includes wherein the proximity detector is an active infrared (IR) proximity detector.

In Example 4, the subject matter of any one or more of Examples 1-3 optionally include wherein the images are two-dimensional images.

In Example 5, the subject matter of any one or more of Examples 1-4 optionally include wherein the first technique includes the controller to: identify a foreground object; and provide the occupancy indication when the foreground object is beyond a threshold size.

In Example 6, the subject matter of Example 5 optionally includes wherein to identify the foreground object the controller is to apply a mixture of Gaussians to a sequence of the images.

In Example 7, the subject matter of any one or more of Examples 5-6 optionally include wherein the second technique includes the controller to: apply a classifier to the foreground object when the foreground object is beyond the threshold size; and provide the occupancy indication based on the result of the classifier.

In Example 8, the subject matter of Example 7 optionally includes wherein the classifier is trained to identify an exclusion object and wherein the occupancy indication is provided when the classifier does not identify the foreground object.

In Example 9, the subject matter of Example 8 optionally includes wherein an exclusion object includes a flying animal.

In Example 10, the subject matter of any one or more of Examples 7-9 optionally include wherein the classifier is trained to identify an inclusion object and wherein the occupancy indication is provided when the classifier does identify the foreground object.

Example 11 is a machine readable medium including instructions that, when executed by a machine, cause the machine to perform operations comprising: receiving images from a camera, the camera having a field of view; receiving a proximity indicator from a proximity detector, the proximity detector arranged to detect an object in the field of view; and processing the images from the camera to provide an occupancy indication, wherein a first technique is used in the absence of the proximity indicator and a second technique is used otherwise.

In Example 12, the subject matter of Example 11 optionally includes wherein the proximity detector has a fixed threshold distance and provides the proximity indicator in response to detecting an object within the fixed threshold distance.

In Example 13, the subject matter of Example 12 optionally includes wherein the proximity detector is an active infrared (IR) proximity detector.

In Example 14, the subject matter of any one or more of Examples 11-13 optionally include wherein the images are two-dimensional images.

In Example 15, the subject matter of any one or more of Examples 11-14 optionally include wherein the first technique includes: identifying a foreground object; and providing the occupancy indication when the foreground object is beyond a threshold size.

In Example 16, the subject matter of Example 15 optionally includes wherein identifying the foreground object includes applying a mixture of Gaussians to a sequence of the images.

In Example 17, the subject matter of any one or more of Examples 15-16 optionally include wherein the second technique includes: applying a classifier to the foreground object when the foreground object is beyond the threshold size; and providing the occupancy indication based on the result of the classifier.

In Example 18, the subject matter of Example 17 optionally includes wherein the classifier is trained to identify an exclusion object and wherein the occupancy indication is provided when the classifier does not identify the foreground object.

In Example 19, the subject matter of Example 18 optionally includes wherein an exclusion object includes a flying animal.

In Example 20, the subject matter of any one or more of Examples 17-19 optionally include wherein the classifier is trained to identify an inclusion object and wherein the occupancy indication is provided when the classifier does identify the foreground object.

Example 21 is a method comprising: receiving images from a camera, the camera having a field of view; receiving a proximity indicator from a proximity detector, the proximity detector arranged to detect an object in the field of view; and processing the images from the camera to provide an occupancy indication, wherein a first technique is used in the absence of the proximity indicator and a second technique is used otherwise.

In Example 22, the subject matter of Example 21 optionally includes wherein the proximity detector has a fixed threshold distance and provides the proximity indicator in response to detecting an object within the fixed threshold distance.

In Example 23, the subject matter of Example 22 optionally includes wherein the proximity detector is an active infrared (IR) proximity detector.

In Example 24, the subject matter of any one or more of Examples 21-23 optionally include wherein the images are two-dimensional images.

In Example 25, the subject matter of any one or more of Examples 21-24 optionally include wherein the first technique includes: identifying a foreground object; and providing the occupancy indication when the foreground object is beyond a threshold size.

In Example 26, the subject matter of Example 25 optionally includes wherein identifying the foreground object includes applying a mixture of Gaussians to a sequence of the images.

In Example 27, the subject matter of any one or more of Examples 25-26 optionally include wherein the second technique includes: applying a classifier to the foreground object when the foreground object is beyond the threshold size; and providing the occupancy indication based on the result of the classifier.

In Example 28, the subject matter of Example 27 optionally includes wherein the classifier is trained to identify an exclusion object and wherein the occupancy indication is provided when the classifier does not identify the foreground object.

In Example 29, the subject matter of Example 28 optionally includes wherein an exclusion object includes a flying animal.

In Example 30, the subject matter of any one or more of Examples 27-29 optionally include wherein the classifier is trained to identify an inclusion object and wherein the occupancy indication is provided when the classifier does identify the foreground object.

Example 31 is a system comprising means to implement any of the methods of Examples 21-30.

Example 32 is a machine readable medium including instructions that, when executed by a machine, cause the machine to implement any of the methods of Examples 21-30.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device, comprising:
   a camera with a field of view;
   a proximity detector arranged to detect an object in the field of view, the proximity detector being separate from the camera, and a sensing area of the proximity detector overlapping with the field of view of the camera and at least a portion of the field of view of the camera is non-overlapping with the sensing area; and
   a controller to:
      receive images from the camera;
      receive a proximity indicator from the sensing area of the proximity detector overlapping with the field of view of the camera, wherein the proximity indicator originates from the proximity detector and indicates absence or presence of the object within the sensing area that overlaps with the field of view of the camera, wherein the proximity detector has a threshold distance and provides the proximity indicator in response to detecting the object within the threshold distance; and
      process the images from the camera to provide an occupancy indication based on the proximity indicator, wherein a first occupancy detection technique is used in the absence of the object from the sensing area, and a second occupancy detection technique is used when the object is present in the sensing area, wherein the first technique is different from the second technique and uses lower power than the second technique.

2. The device of claim 1, wherein the threshold distance is a fixed threshold distance.

3. The device of claim 2, wherein the proximity detector is an active infrared (IR) proximity detector.

4. The device of claim 1, wherein the images are two-dimensional images.

5. The device of claim 1, wherein the first technique includes the controller to:
   identify the object as a foreground object using the images from the camera; and
   provide the occupancy indication when the foreground object is beyond a threshold size.

6. The device of claim 5, wherein to identify the foreground object the controller is to apply a mixture of Gaussians to a sequence of the images.

7. The device of claim 5, wherein the second technique includes the controller to:
   apply pattern matching of a classifier to the foreground object when the foreground object is beyond the threshold size; and
   provide the occupancy indication based on the result of the classifier.

8. The device of claim 7, wherein the classifier is trained to identify an exclusion object and wherein the occupancy indication is provided when the classifier does not identify the foreground object.

9. The device of claim 8, wherein an exclusion object includes a flying animal.

10. The device of claim 7, wherein the classifier is trained to identify an inclusion object and wherein the occupancy indication is provided when the classifier does identify the foreground object.

11. A non-transitory machine-readable medium including instructions that, when executed by a machine, cause the machine to perform operations comprising:
   receiving images from a camera, the camera having a field of view;
   receiving a proximity indicator from a sensing area of a proximity detector overlapping with the field of view of the camera, the proximity detector arranged to detect an object in the field of view, wherein the proximity detector is separate from the camera and wherein the proximity indicator indicates absence or presence of the object within the sensing area overlapping with the field of view of the camera and at least a portion of the field of view of the camera is non-overlapping with the sensing area, wherein the proximity detector has a threshold distance and provides the proximity indicator in response to detecting the object within the threshold distance; and
   processing the images from the camera to provide an occupancy indication based on the proximity indicator, wherein a first occupancy detection technique is used in the absence of the object from the sensing area, and a second occupancy detection technique is used when the object is present in the sensing area, wherein the first occupancy detection technique is different from the second occupancy detection technique and uses lower power than the second technique.

12. The non-transitory machine-readable medium of claim 11, wherein the threshold distance is a fixed threshold distance.

13. The non-transitory machine-readable medium of claim 12, wherein the proximity detector is an active infrared (IR) proximity detector.

14. The non-transitory machine-readable medium of claim 11, wherein the images are two-dimensional images.

15. The non-transitory machine-readable medium of claim 11, wherein the first technique includes:
   identifying the object as a foreground object; and
   providing the occupancy indication when the foreground object is beyond a threshold size.

16. The non-transitory machine-readable medium of claim 15, wherein identifying the foreground object includes applying a mixture of Gaussians to a sequence of the images.

17. The non-transitory machine-readable medium of claim 15, wherein the second technique includes:
   applying pattern matching of a classifier to the foreground object when the foreground object is beyond the threshold size; and
   providing the occupancy indication based on the result of the classifier.

18. The non-transitory machine-readable medium of claim 17, wherein the classifier is trained to identify an exclusion object and wherein the occupancy indication is provided when the classifier does not identify the foreground object.

19. The non-transitory machine-readable medium of claim 18, wherein an exclusion object includes a flying animal.

20. The non-transitory machine-readable medium of claim 17, wherein the classifier is trained to identify an inclusion object and wherein the occupancy indication is provided when the classifier does identify the foreground object.

21. A method for providing occupancy indication, the method comprising:
   by a computing device comprising a proximity detector:
   receiving images from a camera, the camera having a field of view;
   receiving a proximity indicator from a sensing area of the proximity detector overlapping with the field of view of the camera, the proximity detector arranged to detect an object in the field of view, wherein the proximity detector is separate from the camera and wherein the proximity indicator indicates absence or presence of the object within the sensing area overlapping with the field of view of the camera and at least a portion of the field of view of the camera is non-overlapping with the sensing area, wherein the proximity detector has a threshold distance and provides the proximity indicator in response to detecting the object within the threshold distance; and
   processing the images from the camera to provide an occupancy indication based on the proximity indicator, wherein a first occupancy detection technique is used in the absence of the object from the sensing area, and a second occupancy detection technique is used when the object is present in the sensing area, wherein the first occupancy detection technique is different from the second occupancy detection technique and uses lower power than the second occupancy detection technique.

22. The method of claim 21, wherein the threshold distance is a fixed threshold distance.

23. The method of claim 21, wherein the proximity detector is an active infrared (IR) proximity detector.

24. The method of claim 21, further comprising:
   identifying the object as a foreground object; and
   providing the occupancy indication when the foreground object is beyond a threshold size.

25. The method of claim 24, wherein identifying the foreground object includes applying a mixture of Gaussians to a sequence of the images.

* * * * *

UNITED STATES PATENT AND TRADEMARK OFFICE
CERTIFICATE OF CORRECTION

PATENT NO. : 10,290,194 B2
APPLICATION NO. : 15/056560
DATED : May 14, 2019
INVENTOR(S) : Akshayakumar Haribhatt It is certified that error appears in the above-identified patent and that said Letters Patent is hereby corrected as shown below:

On the Title Page

In item (57), in "Abstract", in Column 2, Line 3, after "certain", delete "a"

Signed and Sealed this
Twelfth Day of May, 2020

Andrei Iancu
*Director of the United States Patent and Trademark Office*